Oct. 29, 1968   G. A. MARCHAND   3,407,629
HEAT SHIELD
Filed Sept. 26, 1966
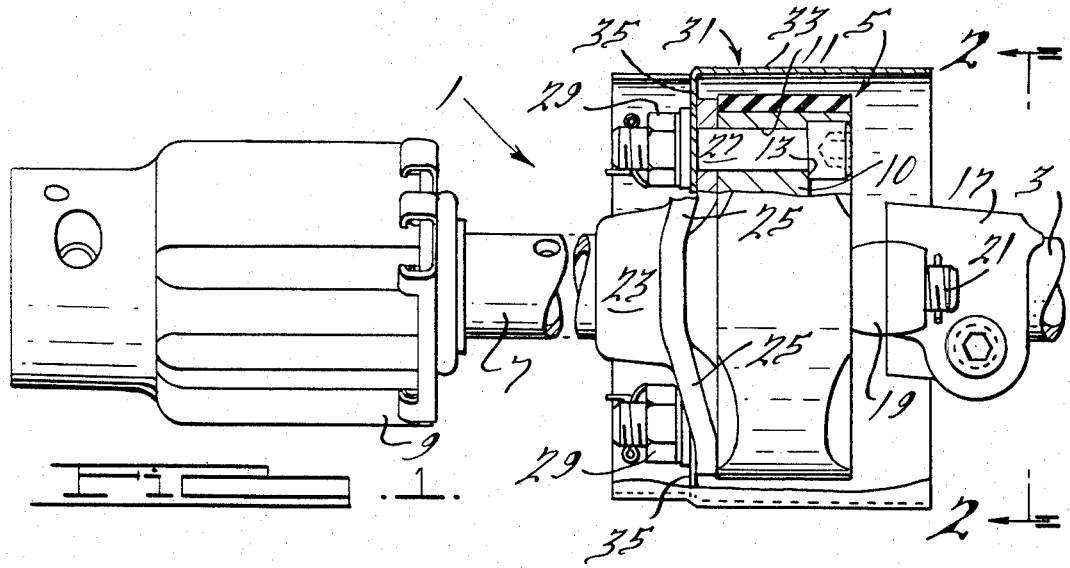
FIG. 1.
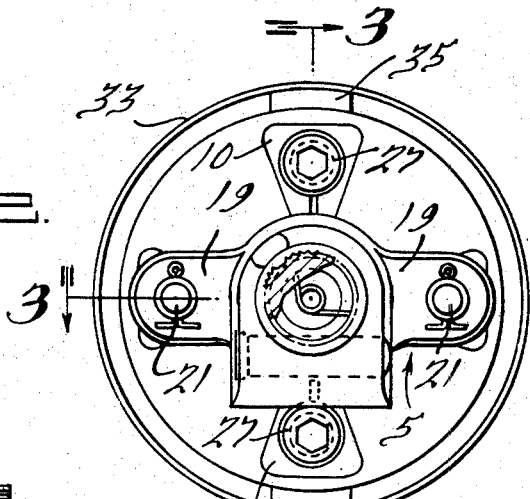
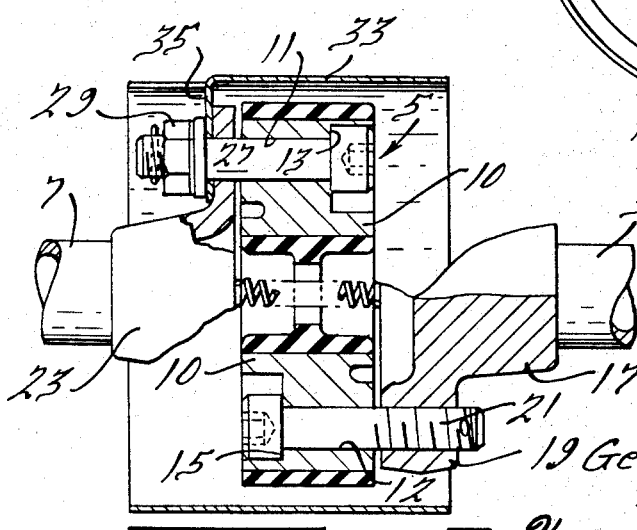
FIG. 3.
INVENTOR.
George A. Marchand
BY
Harness, Dickey & Pierce
ATTORNEYS.

United States Patent Office 3,407,629
Patented Oct. 29, 1968

3,407,629
HEAT SHIELD
George A. Marchand, Detroit, Mich., assignor to Chrysler Corporation, Highland Park, Mich., a corporation of Delaware
Filed Sept. 26, 1966, Ser. No. 581,904
3 Claims. (Cl. 64—32)

ABSTRACT OF THE DISCLOSURE

Heat shield for a resilient coupling in the steering column of a vehicle comprising a tubular metal member surrounding the coupling, and ears extending inwardly from the tubular member. The ears have holes therein through which fasteners extend for connecting the tubular heat shield to the resilient coupling.

---

This invention relates to a heat shield, and more particularly to a heat shield for protecting a resilient coupling member from the heat emitted from hot motor parts of an automotive vehicle.

In an automotive vehicle, the steering column passes downwardly from the passenger compartment through the cowl or fire-wall to a steering gear mechanism. The lower portion of the column is divided into two generally axially aligned shafts coupled together by a resilient coupling to prevent transmission of noise and vibrations in the lower shaft upwardly through the upper shaft and column to the steering wheel. The resilient coupling also allows greater angular variations between the shafts during assembly of the steering column. However, the lower end of the column is in close proximity to hot engine parts, and particularly the exhaust manifold. The heat emitted from the hot engine parts has an adverse effect upon the resilient coupling and accordingly, it is necessary to protect the coupling from the heat. This protection has, in the past, been provided by a cup-shaped member attached to the column. The coupling was located inside the cup-shaped member. While this type of shield afforded the protection necessary, it was difficult to assemble and install. The present invention is an improvement over heat shields heretofore used.

One of the primary objects of this invention is to provide a heat shield for a resilient coupling in the steering column of an automotive vehicle, the heat shield being adapted to permit the flow of air between the shield and the coupling for reducing the transfer of heat to the coupling.

Another object of this invention is the provision of a heat shield of the class described which is maintained at a predetermined distance from the coupling at all times, to permit uniform cooling of the coupling.

A further object of this invention is the provision of a heat shield such as described which may be installed during assembly of the coupling, thus reducing installation expense.

Still another object of this invention is to provide a heat shield of the type described which is simple and economical in construction, and efficient in operation.

Other objects and advantages of this invention will be made apparent as the description progresses.

In the accompanying drawings, in which one of various possible embodiments is illustrated.

FIG. 1 is side elevation of a portion of a steering column having a heat shield of this invention installed thereon;

FIG. 2 is an end view of FIG. 1 taken from the right hand end of FIG. 1; and

FIG. 3 is a section taken along line 3—3 of FIG. 2.

Like parts are designated by corresponding reference characters throughout the several views of the drawings.

Referring now to the drawings, the lower portion of an automotive steering column is generally indicated at 1. The lower portion 1 includes a first or upper shaft 3 connected by a coupling 5 to a second or lower shaft 7. The lower end of shaft 7, the left hand end as viewed in FIG. 1, is connected to a universal coupling 8 attached to the steering gear (not shown).

It will be appreciated that the coupling must be adapted to prevent the transmission of vibrations from shaft 7 to shaft 3 without creating any undue play between the two shafts. The coupling 5 includes a resilient and preferably rubber member 9 having a cylindrical shape and approximately one inch thick. Member 9 has four rigid inserts 10 spaced approximately 90° apart. Inserts 10 have holes 11 and 12 extending axially therethrough relative to shafts 3 and 7. Holes 11 are countersunk as indicated at 13 on one side of member 9 and holes 12 are countersunk as indicated at 15 on the other side of the member.

A bracket 17 having laterally extending arms 19 is secured to the lower end of shaft 3. Arms 19 have threaded holes aligned with holes 12. Bolts 21 extend through holes 12 into the threaded holes in arms 19 to secure the resilient member 9 to the bracket 17 and shaft 3.

A bracket 23 connected to the upper end of shaft 7 has laterally extending arms 25 which are connected to resilient member 9 by bolts 27 extending, from the right-hand side of member 9 as viewed in FIG. 1, through the member and arms 25. Nuts 29 are fastened on the ends of bolts 27 to secure to arms 25 to the resilient member. When the coupling 5 is installed in an automotive vehicle it is located in close proximity to the exhaust manifold.

A heat shield of this invention is generally indicated at 31. It comprises a generally cylindrical tubular member 33 preferably formed of a heat dissipating material, such as steel for example. One end of member 33 has two opposed ear portions 35 turned inwardly toward one another. Ears 35 are positioned between arms 25 of bracket 25 and nuts 29 and have holes therein through which bolts 27 pass for securing the shield to the resilient member 9. The positive attachment provided by the bolt and nut connection rigidly maintains the cylindrical member 33 a predetermined distance away from the outer periphery of resilient member 9 so that air may pass through the heat shield around member 9 and remove heat from the latter and from the heat shield per se. This prevents excessive heat build up around the member 9 and thus avoids damage to the latter as a result of the heat emitted by hot engine parts such as the exhaust manifold.

A coil spring 37 extends from upper shaft 3 through member 9 into contact with the lower shaft 7 to provide an electrical connection between the two shafts. This is desirable for grounding the automotive vehicle horn. If desired, the spring 37 could be replaced by a wire having an eye on one end encircling a bolt 21 adjacent the respective arm 19. The other end of the wire could be connected to the inside of tubular shield 33 by means of a weld, or an internally struck tang, for example, since the shield is electrically connected to bracket 23 by the ears 35.

It will be seen that the heat shield 31 may be easily attached to the coupling 5 during assembly of the latter, thus eliminating the installation expense which would occur if the shield were added after the unit was assembled. The heat shield allows air to flow around the resilient member 9 for removing heat from the area, thus increasing the life of the resilient member.

In view of the foregoing, it will be seen that the several objects and other advantages of this invention are attained.

It will be understood that the invention is not to be limited to the exact constructions shown and described, but that various changes and modifications may be made without departing from the spirit and scope of the invention, as defined in the appended claims.

I claim:

1. A heat shield for a resilient coupling in the steering column of a vehicle adjacent hot engine parts, the coupling including a resilient member, a pair of brackets located on opposite sides of said member, and fasteners extending through said brackets and said member for connecting them together, said heat shield comprising a tubular metal member surrounding the coupling, and means on said tubular member connecting said tubular member to said coupling, said tubular member being open at opposite ends for allowing air to flow therethrough for removing heat from said resilient member and said tubular member.

2. A heat shield as set forth in claim 1 wherein said means connecting said shield to said coupling includes ears extending inwardly from said tubular member, said ears having holes therein through which said fasteners extend.

3. A heat shield as set forth in claim 2 wherein said ears are portions of said tubular member bent inwardly toward said couplings.

References Cited

UNITED STATES PATENTS

| | | | |
|---|---|---|---|
| 2,295,003 | 9/1942 | Natkins | 64—14 |
| 2,753,848 | 7/1956 | Burton | 64—13 X |
| 2,983,123 | 5/1961 | Spase | 64—30 |
| 3,104,536 | 9/1963 | Walterscheid-Muller | 64—32 |
| 3,111,825 | 11/1963 | Stillwagon | 64—32 |

HALL C. COE, *Primary Examiner.*